United States Patent [19]

Aron et al.

[11] Patent Number: 4,519,194
[45] Date of Patent: May 28, 1985

[54] HAY HARVESTING MACHINE

[75] Inventors: Jerome Aron, Bouxwiller; Michel Quirin, Wasselonne, both of France

[73] Assignee: Belrecolt S.A., Marmoutier, France

[21] Appl. No.: 510,268

[22] Filed: Jul. 1, 1983

[30] Foreign Application Priority Data

Jul. 8, 1982 [FR] France .............................. 82 12159

[51] Int. Cl.³ .......................................... A01D 78/12
[52] U.S. Cl. ...................................... 56/370; 56/366
[58] Field of Search ............... 56/364, 365, 370, 374, 56/192, 366

[56] References Cited

U.S. PATENT DOCUMENTS 4,346,549 8/1982 Wattron et al. ....................... 56/370
4,380,142 4/1983 Wattron et al. ....................... 56/370
4,397,135 8/1983 Wattron ................................ 56/370

FOREIGN PATENT DOCUMENTS 2065435 7/1981 United Kingdom .................. 56/370

Primary Examiner—Gene Mancene
Assistant Examiner—John G. Weiss
Attorney, Agent, or Firm—Ernest F. Marmorek

[57] ABSTRACT

A hay harvesting machine for windrowing hay, moving swaths of hay, tedding hay and the like includes at least one drum which has a base and a wall, and is rotatable about an axis which is inclined within a predetermined range to the vertical, a flexible skirt which has substantially the shape of a truncated cone, and is connected to the base for sweeping up the hay, and a plurality of arms arranged in a plurality of rows along the wall, and which extend therefrom so as to cooperate with the skirt for further movement of the hay, and wherein at least the arms of the row nearest to the skirt extend in a direction substantially parallel with an upper surface of the skirt.

7 Claims, 3 Drawing Figures

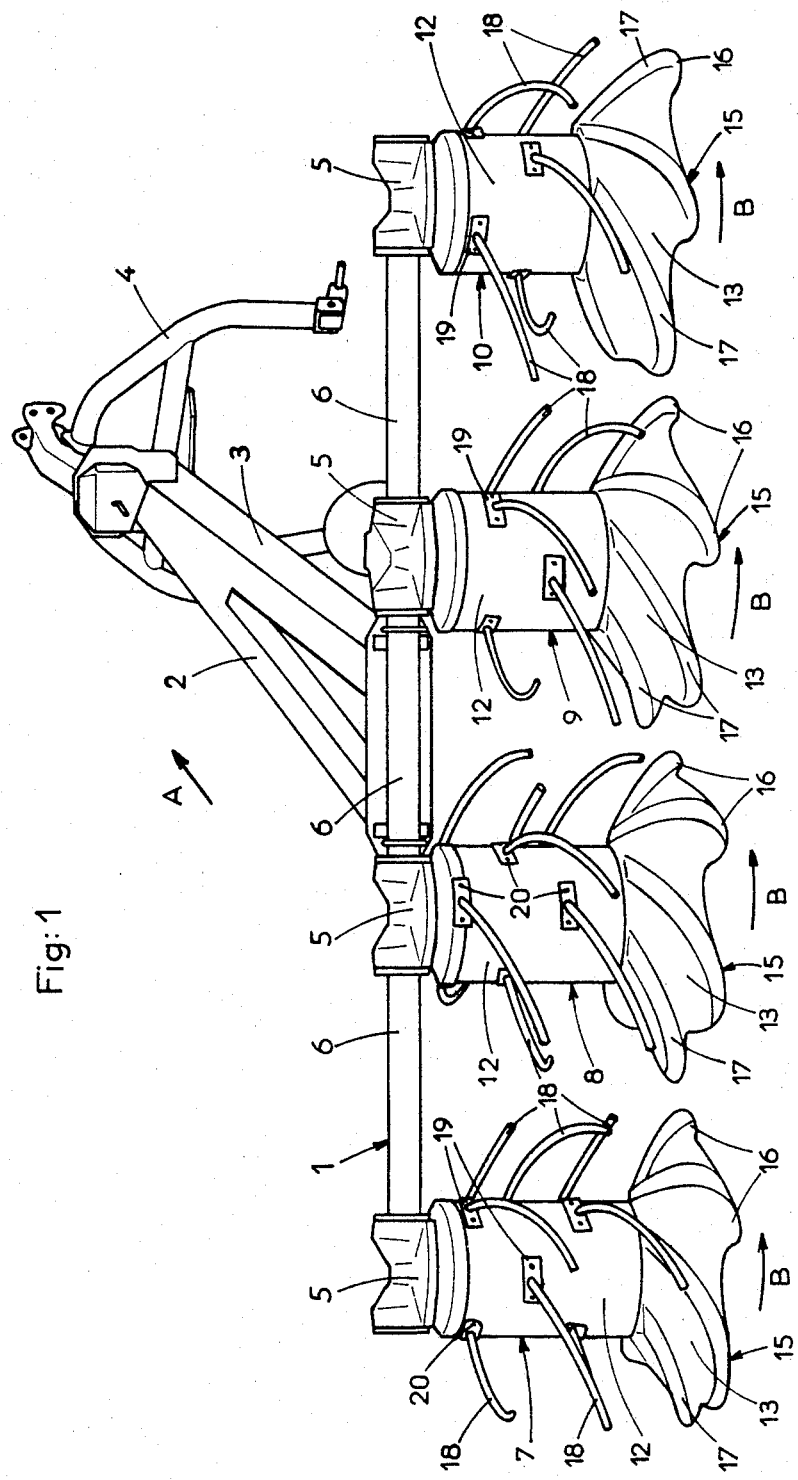
Fig:1

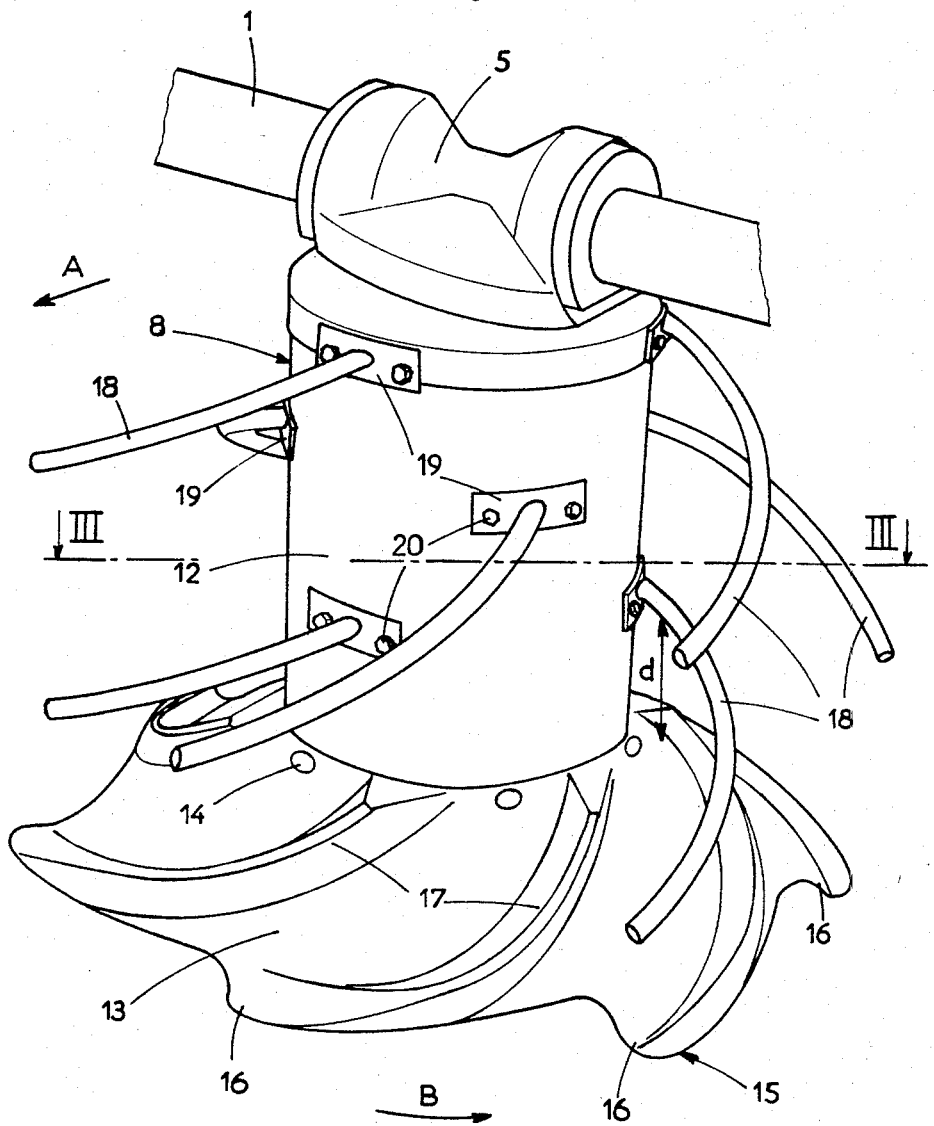
Fig: 2

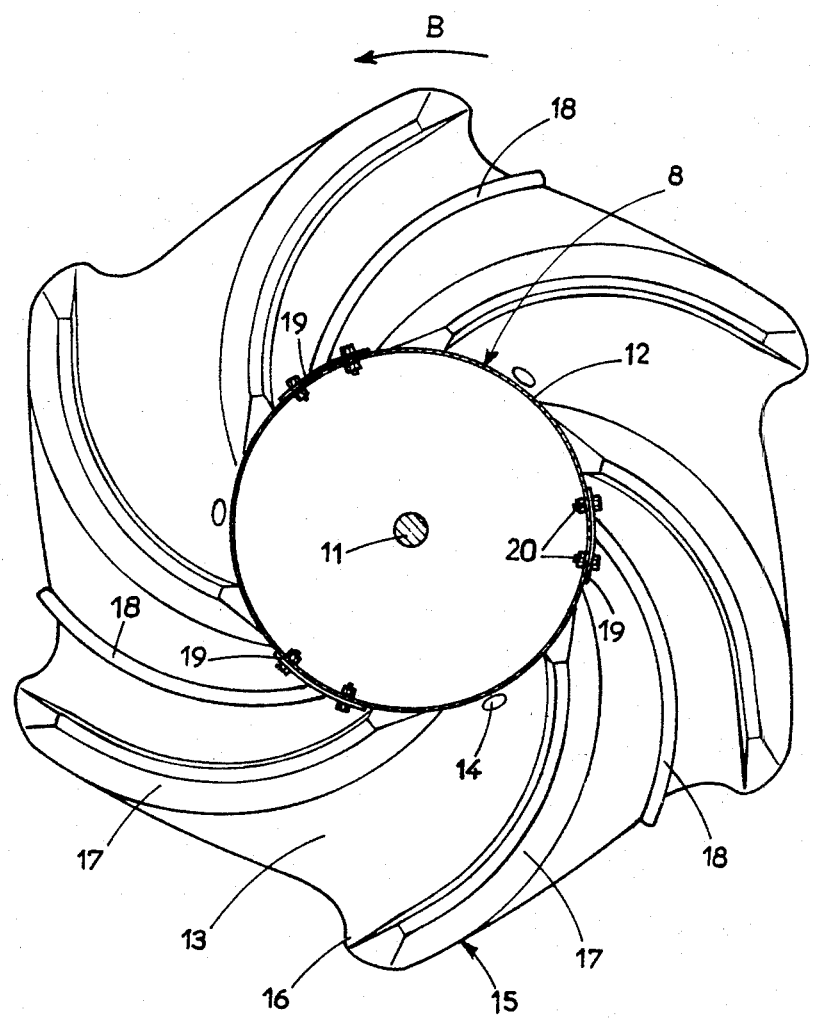
Fig: 3

HAY HARVESTING MACHINE

BACKGROUND OF THE INVENTION

1. Field of the Invention

The invention relates to a hay harvesting machine for windrowing hay, moving swaths of hay, tedding hay and the like which includes at least one drum which has a base and a wall, and is rotatable about an axis which is inclined within a predetermined range to the vertical, a flexible skirt which has substantially the shape of a truncated cone, and is connected to the base for sweeping up the hay, and a plurality of arms arranged in a plurality of rows along the wall, and which extend therefrom so as to cooperate with the skirt for further movement of the hay.

2. Description of the Prior Art

In a machine of this type, each drum is provided with arms for facilitating the displacement of hay. These arms are disposed on several rows or levels. The arms of the upper levels extend in planes substantially perpendicular to the axis of rotation of the corresponding drum, while the arms of the lowest level are slightly bent downwardly. The arms of the lowest level are mounted on the wall of each drum near the skirt thereof; each skirt is connected to a respective drum. The arms of the lowest level of each drum thus form an an acute angle with the skirt of the drum.

The space between the arms of the lowest level and the skirt frequently becomes clogged. In fact, the hay which is transported on the upper surface of the skirt glides below the arms of the lowest level and remains wedged between these arms and the skirt. Such a clogging of the aforedescribed space impairs transportation of hay. The operator of the machine is thus obliged to intervene manually and to withdraw any hay wedged in this manner. This operation is very tedious as it necessitates an interruption of the work each time the aforedescribed space becomes clogged.

Furthermore, the arms of the prior art do not cooperate very efficiently with the skirts of the respective drums for moving the hay. When the hay is very dense it often passes over the drums.

SUMMARY OF THE INVENTION

It is an object of the present invention to remedy the aforementioned disadvantages. This object is attained in a hay harvesting machine for windrowing hay, moving swaths of hay, tedding hay and the like which includes at least one drum which has a base and a wall, and is rotatable about an axis which is inclined within a predetermined range to the vertical, a flexible skirt which has substantially the shape of a truncated cone, and is connected to the base for sweeping up the hay, and a plurality of arms arranged in a plurality of rows along the wall, and which extend therefrom so as to cooperate with the skirt for further movement of the hay, and wherein at least the arms of the row nearest to the skirt extend in a direction substantially parallel with an upper surface of the skirt.

Due to this feature, the distance between the skirt and the arms nearest to the skirt remains practically constant over the entire length of these arms. Thus the hay is no longer wedged between the skirt and the arms of the lowest row and can therefore freely leave the skirt at the desired location.

The spacing between each arm of the row nearest to the skirt is at least equal to 5 centimeters. This proper spacing is thus important in order to avoid any wedging of the hay between the arms of the lowest row and the skirt. In addition, the skirt and the arms of the lowest row are prevented from touching one another during operation of the machine when the skirt follows any uneven variations of the ground.

According to another feature of the invention, all arms are arcuate, and extend outwardly and downwardly from the wall of the drum in a direction opposite to the direction of rotation of a corresponding drum. Due to their orientation the arms therefore push the hay constantly downwardly in the direction of the skirt. This construction therefore ensures good cooperation of the arms of the lowest row with the skirt movement of the hay. This is particularly advantageous when the hay is dense and would otherwise have the tendency to pass over the drums.

In order to further improve the cooperation of the skirt and the arms of the lowest row, the curvature of the arms is made similar to the curvature of each rib disposed on the upper surface of the skirt. Advantageously, the arms of the row nearest to the skirt are placed half-way between two adjacent ribs of the upper surface of the skirt, along a peripheral direction, as seen in plan view of the drum looking towards the skirt.

Furthermore, the arms extend substantially as far outwardly as the outer rim of the skirt of the corresponding drum. Thus the hay is rapidly placed in contact with the arms. This prevents any accumulation of hay on the front portion of each drum.

According to another feature of the invention, the arms are displaced from one row with respect to an adjoining row approximately half way between two neighboring arms of the adjoining row. Such a distribution of the arms assures a continuous and uniform removal of the hay.

Each arm has advantageously a round cross-section so that it does not present any arresting surface to the hay at which the hay could remain caught.

BRIEF DESCRIPTION OF THE DRAWINGS

For a fuller understanding of the nature and objects of the invention, reference should be had to the following detailed description, taken in connection with the accompanying drawings in which:

FIG. 1 is a perspective view of a machine according to the invention in a position of lateral swathing of the hay;

FIG. 2 is a large scale perspective view of a drum of the machine; and

FIG. 3 is a top plan view along lines III—III of FIG. 2.

DESCRIPTION OF THE PREFERRED EMBODIMENTS

Referring now to the drawings, and particularly to FIG. 1, the machine according to the invention includes an elongated frame 1. To the frame 1 there are connected two beams 2 and 3 arranged in the form of a V, to the apex of which there is connected a support 4 provided with three connectors. The support 4 permits coupling of the machine to a (non-illustrated) tractor which propels the machine along the direction of the arrow A.

The frame 1 is made of four holders 5 connected to one another by means of tubes 6. To each holder 5 there is connected a respective drum 7, 8, 9 and 10 freely rotatable in relation to axles 11 rigid with the frame 1. Each axle 11 includes at its lower portion a (non-illustrated) wheel or a runner serving as support for the machine when it is moved along the ground or rests thereon.

In the position shown in FIG. 1, the frame 1 is disposed transversely in relation to the direction of forward movement A. This arrangement facilitates the transfer of hay from one drum to another for the purpose of obtaining a swath of hay on the side of drum 7 disposed at the rearmost extremity of the machine.

During operation the four drums 7 to 10 are rotated about respective axles 11 in the same direction. This direction of rotation is indicated by the arrows B. The axles 11 will be generally upright, namely either extend in a vertical direction or be slightly inclined toward the front, in the direction of the forward movement A of the machine.

The rotation of the drums 7 to 10 is effected by means of a (non-illustrated) shaft mounted in the frame 1. For this purpose there is coupled to that shaft in each holder 5 a (non-illustrated) conical pinion or bevel gear which meshes with a (non-illustrated) toothed gear integral with a corresponding drum 7,8,9 or 10. The (non-illustrated) shaft in the frame 1 is itself rotated in a known manner by another (non-illustrated) shaft powered by the pulling tractor.

The outer walls or mantles 12 of the drums 7 to 10 are rigid. They may be made, for example, from sheet metal or from a rigid plastic material. To each drum 7 8, 9 and 10 there is attached at its lower portion a flexible skirt 13 which has the shape of a truncated cone. The skirts 13 may be made of rubber, plastic or another analogous material. The skirts 13 may be mounted to the drums 7,8,9 and 10, for example, by means of rivets 14. During operation they are thrust below the hay, following faithfully any unevenness of the ground, and cause the hay to move to their upper surface. From the exterior rim 15 of each drum there extend projections 16 which facilitate gathering of the hay onto the skirts 13. The gathering or harvesting of the hay is likewise facilitated by any forward inclination of the drums 7,8,9 or 10. In fact, such an inclination permits an improved contact of the skirts 13 with the ground in the front part of their trajectories. Furthermore, the upper surface of the skirts 13 is provided with arcuate ribs 17 to facilitate entrainment of the hay.

The hay gathered by the skirts 13 is shifted from one drum to the next and is deposited laterally of the machine in the form of a swath. This shifting movement of the hay is improved by means of arms 18 extending from the walls 12 of the drums 7,8,9 and 10. These arms 18 also prevent the passing of any hay into spaces between neighboring drums 7,8,9 and 10.

The arms 18 extend from several levels or rows of a respective drum. The drums 7 and 8 which are nearest to the swath can carry more arms than the remaining drums 9 and 10, since the volume of hay that they handle is more important.

In accordance with an important feature of the invention, at least the arms 18 which are disposed nearest to the skirts 13 extend substantially parallel with the skirts 13 as best seen in FIG. 2. The spacing between the arms 18 and the skirts 13 thus remains relatively constant. Furthermore, the spacing d between the arms 18 which are closest to the skirts 13 and these skirts 13 is at least 5 centimeters. Very good results have been obtained with machines where the spacing d ranged between 10 and 14 centimeters. Due to the aforementioned spacing between the skirts 13 and the arms 18 of the lowest row of arms on a respective drum, the hay does not get wedged therebetween. Furthermore, the arms 18 neither touch the skirts 13, nor touch the ground during operation.

The arms 18 are arcuate in shape, and extend outwardly and downwardly from the wall of a corresponding drum in a direction opposite to the direction of rotation B of the drums 7,8,9 and 10. During operation the arms 18 push the hay towards the skirts 13 and become easily disengaged therefrom along the lateral portions of the drums 7,8,9 and 10.

As can be seen from FIG. 3, the curvature of the arms 18 is similar to that of the ribs 17 disposed on the upper surface of the skirts 13. The hay is thus displaced in the same manner by the ribs 17 and by the arms 18. The ribs 17 and the arms 18 thus do not pull the hay at an unequal rate, which fact facilitates steady transportation of the hay.

The arms 18 extend outwardly at least as far as the exterior rim 15 of each skirt 13 of a respective drum 7,8,9 and 10. This feature assures instantaneous removal and transportation of the hay and prevents any accumulation of hay along the front side of the drums 7,8,9 and 10.

The arms 18 extend from the walls 12 of the drums 7,8,9 and 10 so as to obtain a continuous movement of the hay. By means of such a movement a swath of hay at a steady rate of volume is obtained. For this purpose, each arm 18 of the row of arms nearest to the skirt 13 extends approximately half-way between two adjoining ribs 17 along a peripheral direction as seen in plan view of a drum 7,8,9, or 10 looking towards a respective skirt 13. In addition, the arms 18 of one row are displaced with respect to an adjoining row approximately half-way between two neighboring arms of the adjoining row as seen in plan view of a drum looking towards a respective skirt 13. This is best seen in FIGS. 2 and 3.

The arms 18 have advantageously a round cross-section so that the hay is not caught on the arms 18. The arms 18 may, for example, be made of steel or of plastic material. A base support, for example, in the form of a plate 19 has a curvature on a side thereof facing the wall of a corresponding drum 7,8,9 or 10 which substantially matches the curvature of that wall. The plate 19 may be mounted to the drum, for example, by bolts 20. This permits disassembly and replacement of the arms 18 in the case of wear and tear of the arms 18.

It will be understood that the number of drums equipped with arms 18 as described hereinabove may vary without exceeding the scope of the invention. Likewise, the drum or drums may be placed ahead of or behind the pulling tractor. The machine may also be used for reducing the size of a swath or moving a swath either solely, or in cooperation with any other machines, such as mowers, combinations of mowers and hay conditioners, and storage equipment.

I wish it to be understood that I do not desire to be limited to the exact details of construction shown and described, for obvious modifications will occur to a person skilled in the art.

Having thus described the invention, what I claim as new and desire to be secured by Letters Patents is as follows:

1. A hay harvesting machine for windrowing hay, moving swaths of hay, tedding hay and the like
   comprising in combination at least one drum having a base and a wall, and being rotatable about a substantially upright axis in a predetermined direction, a flexible skirt connected to said base for sweeping up the hay, said skirt having substantially the shape of a truncated cone and including a plurality of ribs each having a predetermined curvature, a plurality of arms arranged in a plurality of rows along said wall and extending therefrom, each arm having a curvature substantially the same as the curvature of each rib so as to cooperate with said skirt for further movement of the hay, at least the arms of the row nearest to said skirt extending in a direction substantially parallel to said skirt wherein the spacing of said skirt from each arm of the row nearest said skirt is at least 5 cm.

2. The harvesting machine as claimed in claim 1, wherein said ribs are spaced from one another at a predetermined distance, and wherein each arm of said row nearest to said skirt extends approximately half-way between two adjoining ribs along a peripheral direction as seen in plan view of said drum looking towards said skirt.

3. The harvesting machine as claimed in claim 1, wherein said skirt has an exterior rim, and wherein the arms extend substantially at least as far outwardly as said exterior rim as seen in plan view of said drum looking towards said skirt.

4. The harvesting machine as claimed in claim 1, wherein the arms of one row are displaced with respect to an adjoining row approximately half-way between two neighboring arms of the adjoining row as seen in plan view of said drum looking towards said skirt.

5. The harvesting machine as claimed in claim 1, wherein each arm has a round cross-section.

6. The harvesting machine as claimed in claim 1, further including a base support connected to an interior end of each arm and mounted on said drum.

7. The harvesting machine as claimed in claim 6, wherein said base support includes a plate having a curvature on a side thereof facing said wall, said curvature of said plate substantially matching the curvature of said drum.

* * * * *